United States Patent
Yokosawa et al.

(10) Patent No.: US 9,609,691 B2
(45) Date of Patent: Mar. 28, 2017

(54) REMOTE RADIO EQUIPMENT

(71) Applicant: FUJITSU LIMITED, Kawasaki-shi, Kanagawa (JP)

(72) Inventors: Tadanori Yokosawa, Yokosuka (JP); Hiroyuki Sekino, Yokohama (JP); Hitoshi Nakazawa, Kawasaki (JP); Kazutomo Tsuji, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/130,051

(22) Filed: Apr. 15, 2016

(65) Prior Publication Data

US 2016/0360571 A1   Dec. 8, 2016

(30) Foreign Application Priority Data

Jun. 2, 2015   (JP) .................................. 2015-112524

(51) Int. Cl.
*H04M 1/00* (2006.01)
*H04W 88/08* (2009.01)
*H04B 1/04* (2006.01)

(52) U.S. Cl.
CPC ............ *H04W 88/085* (2013.01); *H04B 1/04* (2013.01)

(58) Field of Classification Search
CPC ................ H04W 88/08; H04W 88/085; H04B 10/25753
USPC ............................... 455/561, 572, 562.1, 522
See application file for complete search history.

(56) References Cited

U.S. PATENT DOCUMENTS

| | | | |
|---|---|---|---|
| 8,811,925 B2* | 8/2014 | Satapathy | H01Q 1/246 370/294 |
| 9,281,866 B2* | 3/2016 | Smentek | H04B 3/44 |
| 9,448,576 B2* | 9/2016 | Chamberlain | G05F 1/62 |
| 2015/0326317 A1* | 11/2015 | Michaelis | H04B 10/807 398/115 |

FOREIGN PATENT DOCUMENTS

| | | |
|---|---|---|
| JP | 2001-332985 | 11/2001 |
| JP | 2013-026892 | 2/2013 |

* cited by examiner

*Primary Examiner* — Sonny Trinh
(74) *Attorney, Agent, or Firm* — Fujitsu Patent Center

(57) ABSTRACT

An RRH includes a power supply device, an AISG interface, a PA, and a control unit. The PA is operated by a power source with a first voltage or a second voltage that is lower than the first voltage and amplifies a transmission signal. The AISG interface is connected to an antenna control device operated by the power source with the second voltage. The power supply device supplies the power source to the PA and the power source to the antenna control device to the AISG interface. When the antenna control device is operated, the control unit controls such that the power supply device generates the power source with the second voltage, supplies the generated power source to the PA and the antenna control device, and increase power of the transmission signal output from the PA that is operated by the power source with the second voltage.

7 Claims, 14 Drawing Sheets

REMOTE RADIO EQUIPMENT

CROSS-REFERENCE TO RELATED APPLICATION

This application is based upon and claims the benefit of priority of the prior Japanese Patent Application No. 2015-112524, filed on Jun. 2, 2015, the entire contents of which are incorporated herein by reference.

FIELD

The embodiments discussed herein are related to remote radio equipment.

BACKGROUND

In recent years, in mobile communication systems, separate type base station devices that include base band units (BBU) and remote radio heads (RRH) have been widely used. The BBU is a device that performs a connection with a higher-level core network and that performs a baseband process.

The RRH is a device that amplifies an analog signal and that performs a wireless connection with mobile terminals and is also called remote radio equipment. The RRH is connected to the BBU via optical fibers and an overhang of 20 km or more is possible. Furthermore, the RRH is connected to an antenna control device that performs tilt control and state monitoring of an antenna. The RRH and the antenna control device are usually connected via an AISG interface conforming to a standard defined by the Antenna Interface Standards Group (AISG). The AISG interface is defined such that, in addition to an Operations Administration Maintenance (OAM) signal used for maintenance management, a predetermined voltage (for example, +24 V±3 V) is supplied as power source of the antenna control device.

Furthermore, in the RRH, a power amplifier that amplifies a transmission signal is included. The voltage of the power source of the power amplifier is usually higher than the voltage of the power source of the antenna control device. Thus, on the RRH, a power supply device that generates the voltage of power source for the power amplifier and a power supply device that generates the voltage of power source for the antenna control device are separately mounted. Related-art examples are described in Japanese Laid-open Patent Publication No. 2001-332985 and No. 2013-26892.

The antenna control device may sometimes be operated due to area interpolation that occurs when an adjacent base station device is failed. However, because a failure of the base station device does not occur so often, the frequency of operation of the antenna control device is quite low, for example, for few minutes once every few months. Although the frequency of use is low, because the RRH has mounted thereon the power supply device for the antenna control device, reducing the size and the weight of the RRH is difficult.

It is conceivable that the power source for the power amplifier and the power source for the antenna control device are generated from a single power supply device in a shared manner. However, because the power amplifier is operated by the power source with a voltage higher than that of the power source for the antenna control device, if the power source with the voltage for the antenna control device is supplied to the power amplifier, it is difficult to sufficiently obtain the performance, such as the gain or the distortion characteristics of the power amplifier.

SUMMARY

According to an aspect of an embodiment, a remote radio equipment includes a power amplifier, an apparatus interface, a power supply device, and a control unit. The power amplifier is operated by a power source with a first voltage or with a second voltage that is lower than the first voltage and that amplifies a transmission signal. The apparatus interface is connected to an external apparatus that is operated by the power source with the second voltage. The power supply device supplies the power source to the power amplifier and that also supplies the power source to the external apparatus via the apparatus interface. The control unit controls, when the external apparatus is operated, the power supply device to generate, in common, the power source with the second voltage with respect to the power amplifier and the external apparatus, supply the generated power source with the second voltage to the power amplifier and the external apparatus, and increase power of the transmission signal that is output from the power amplifier operated by the power source with the second voltage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The disclosed technology is not limited to the embodiment described below. The embodiments can be appropriately used in combination as long as the processes do not conflict with each other.

[a] First Embodiment

Base Station System 10

Figure 1:
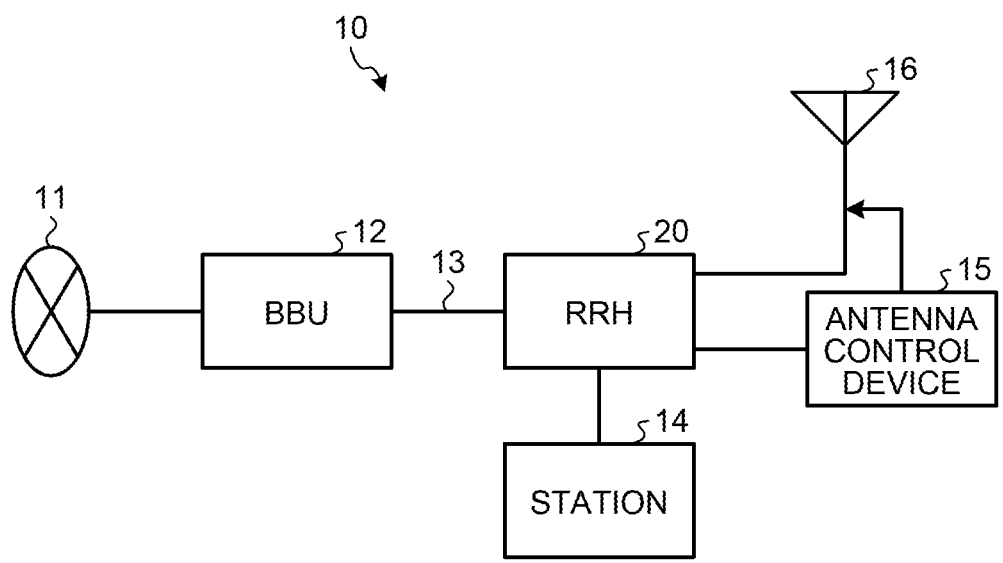
FIG. 1 is a block diagram illustrating an example of a base station system.

FIG. 1 is a block diagram illustrating an example of a base station system 10. The base station system 10 is a base station system that is used in, for example, a cellular-type digital mobile phone system and includes a BBU 12, an antenna control device 15, an antenna 16, and an RRH 20. In the base station system 10 illustrated in FIG. 1, the single RRH 20 is connected to the BBU 12; however, two or more RRHs 20 may also be connected to the BBU 12.

The BBU 12 is connected to a core network 11, performs a baseband process, such as encoding or the like, on transmission data received from the core network 11, and transmits the processed transmission signal to the RRH 20 via an optical fiber cable 13. Furthermore, the BBU 12 performs a baseband process, such as decoding or the like, on a reception signal received from the RRH 20 via the optical fiber cable 13, and transmits the processed reception data to the core network 11.

Furthermore, when the BBU 12 receives, via the core network 11, a message that instructs to control the antenna control device 15, the BBU 12 receives transmits the received message to the RRH 20 via the optical fiber cable 13. Furthermore, when the BBU 12 receives, from the RRH 20, a message that indicates a response to the message that instructs to control the antenna control device 15 or a message that indicates the status of the antenna control device 15, the BBU 12 transmits the received message to the core network 11.

The RRH 20 is operated by the power source supplied from a station 14. The RRH 20 performs a process, such as up-conversion of the frequency of the high frequency band, amplification, and the like, on the baseband transmission signal received form the BBU 12 via the optical fiber cable 13 and transmits the processed transmission signal from the antenna 16. Furthermore, the RRH 20 performs a process, such as amplification, down-conversion of the baseband, and the like, on the reception signal with the frequency of the high frequency band received via the antenna 16 and sends the processed reception signal to the BBU 12 via the optical fiber cable 13.

Furthermore, when the RRH 20 receives, from the BBU 12, a message that instructs control of the antenna control device 15, the RRH 20 supplies the power source with a predetermined voltage to the antenna control device 15 and transfers the received message to the antenna control device 15. Then, after the antenna control device 15 completes the control on the basis of the transferred message, the RRH 20 stops the power supply to the antenna control device 15 and returns a response that indicates the completion of the control.

The antenna control device 15 performs, in accordance with the control instruction indicated by the message transmitted from the RRH 20, tilt control and state monitoring of the antenna 16. In the embodiments, the RRH 20 and the antenna control device 15 are connected via an AISG interface conforming to the standard defined by AISG. The antenna control device 15 is operated by the power source with a predetermined voltage (for example, +24 V±3 V) supplied from the RRH 20 via the AISG interface.

RRH 20

Figure 2:
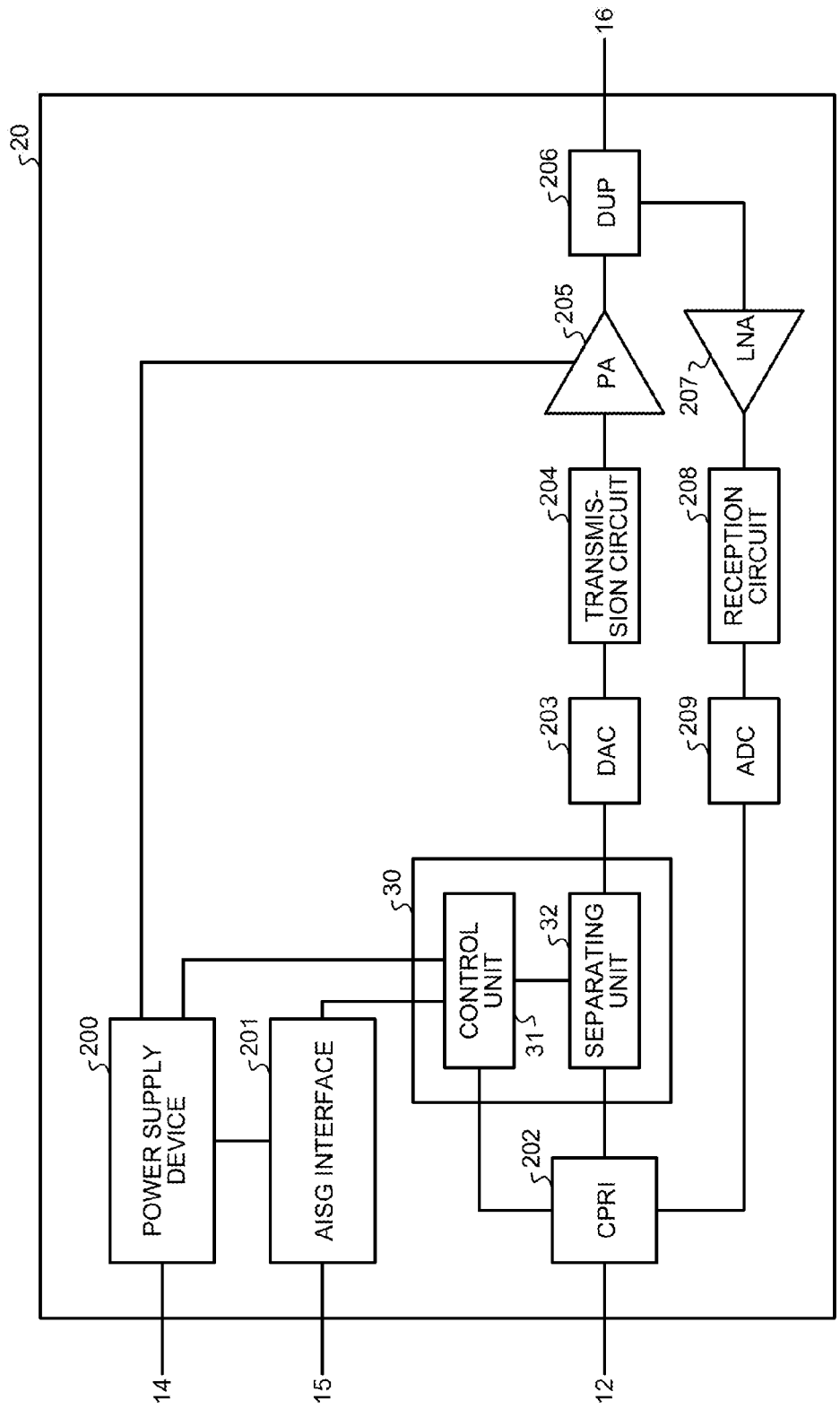
FIG. 2 is a block diagram illustrating an example of an RRH according a first embodiment.

FIG. 2 is a block diagram illustrating an example of the RRH 20 according the first embodiment. The RRH 20 according to the first embodiment includes a power supply device 200, an AISG interface 201, a Common Public Radio Interface (CPRI) 202, and a digital processing unit 30. Furthermore, the RRH 20 according to the first embodiment includes a digital-to-analog converter (DAC) 203, a transmission circuit 204, a power amplifier (PA) 205, and a duplexer (DUP) 206. Furthermore, the RRH 20 according to the first embodiment includes a Low Noise Amplifier (LNA) 207, a reception circuit 208, and an analog-to-digital converter (ADC) 209.

The power supply device 200 generates the power source with a first voltage (for example, +28 V to +50 V) by using the power source (for example, −48 VDC) that is supplied from the station 14 and then supplies the generated power source with the first voltage to the PA 205. Furthermore, when the power supply device 200 receives an instruction from the digital processing unit 30 indicating a power supply to the antenna control device 15, the power supply device 200 generates the power source with a second voltage (for example, +24 V) with respect to, in common, the PA 205 and the antenna control device 15. Then, the power supply device 200 supplies the generated power source with the second voltage to the PA 205 and the AISG interface 201.

Furthermore, when the power supply device 200 receives, from the digital processing unit 30, an instruction to stop the power supply to the antenna control device 15, the power supply device 200 stops the power supply to the AISG interface 201. Then, the power supply device 200 regenerates the power source with the first voltage and supplies the generated power source with the first voltage to the PA 205.

The AISG interface 201 supplies, to the antenna control device 15, the power source with the second voltage supplied from the power supply device 200. Furthermore, the AISG interface 201 transmits, to the antenna control device 15, the message that instructs the control of the antenna control device 15 transmitted from the digital processing unit 30. Furthermore, the AISG interface 201 transmits, to the digital processing unit 30, the message, such as a response to the control instruction or the like, that is transmitted from the antenna control device 15.

The CPRI 202 converts the optical signal that is transmitted from the BBU 12 via the optical fiber cable 13 to an electrical signal and outputs the converted signal to the digital processing unit 30. Furthermore, the CPRI 202 converts the electrical signal that is output from each of the digital processing unit 30 and the ADC 209 to optical signal and transmits the converted signal to the BBU 12 via the optical fiber cable 13.

The digital processing unit 30 includes a control unit 31 and a separating unit 32. The separating unit 32 separates the signal received from the BBU 12 via the CPRI 202 into a transmission signal and a message related to the control of the antenna control device 15. Then, the separating unit 32 outputs the message related to the control of the antenna control device 15 to the control unit 31 and outputs the transmission signal to the DAC 203.

When the control unit 31 receives the message related to the control of the antenna control device 15 from the separating unit 32, the control unit 31 determines whether the received message is a message that instructs to start or stop the power supply to the antenna control device 15. If the message received from the separating unit 32 is a message that instructs to start or stop the power supply to the antenna control device 15, the control unit 31 transmits a dummy response to the BBU 12 via the CPRI 202.

In contrast, if the message received from the separating unit 32 is not the message that instructs to start or stop the power supply to the antenna control device 15, the control unit 31 instructs the power supply device 200 to generate the power source with the second voltage. Then, the control unit 31 transmits, to the antenna control device 15 via the AISG interface 201, the message that indicates the control instruction received from the separating unit 32.

Furthermore, when the control unit 31 receives a response message that indicates the end of the control of the antenna 16 from the antenna control device 15 via the AISG interface 201, the control unit 31 instructs the power supply device 200 to stop the power supply to the antenna control device 15. Then, the control unit 31 instructs the power supply device 200 to generate the power source with the first voltage. Then, the control unit 31 transmits the message received from the antenna control device 15 to the BBU 12 via the CPRI 202.

The digital processing unit 30 is implemented by, for example, a communication processor and a memory. Examples of the communication processor include a central processing unit (CPU), a digital signal processor (DSP), a field programmable gate array (FPGA), or the like. Examples of the memory include a RAM, such as a synchronous dynamic random access memory (SDRAM), or the like, and a read only memory (ROM), a flash memory, or the like.

Various kinds of processing functions included in the digital processing unit 30 can be implemented by, for example, a communication processor reading and executing a program stored in various kinds of memories, such as a nonvolatile storage medium. Furthermore, various kinds of processing functions included in the digital processing unit 30 may also be implemented in a plurality of processors in a distributed manner, the plurality of processors is communicated with each other.

The DAC 203 converts the digital transmission signal received from the digital processing unit 30 to an analog transmission signal. The transmission circuit 204 performs a process, such as quadrature modulation and up-conversion to the frequency of the high frequency band, on the transmission signal that is converted to the analog signal by the DAC 203. The PA 205 is operated by the power source with the voltage supplied from the power supply device 200 and amplifies, at a predetermined amplification rate, the power of the transmission signal processed by the transmission circuit 204. In the first embodiment, the PA 205 is adjusted to be operated by the power source with the first voltage (for example, +28 V to +50 V). Furthermore, in the first embodiment, the PA 205 can be operated at the second voltage (for example, +24 V) that is lower than the first voltage.

The DUP 206 passes, at the transmission band, the transmission signal amplified by the PA 205 and outputs the transmission signal to the antenna 16. Furthermore, the DUP 206 passes, at the reception band, the signal received via the antenna 16 and outputs the signal to the LNA 207. The LNA 207 amplifies the reception signal output from the DUP 206. The reception circuit 208 performs a process, such as down-conversion from the frequency of the high frequency band to the baseband and quadrature detection, on the reception signal amplified by the LNA 207. The ADC 209 converts the analog reception signal processed by the reception circuit 208 to the digital reception signal and outputs the converted digital signal to the digital processing unit 30.

Operation of the Base Station System 10

Figure 3:
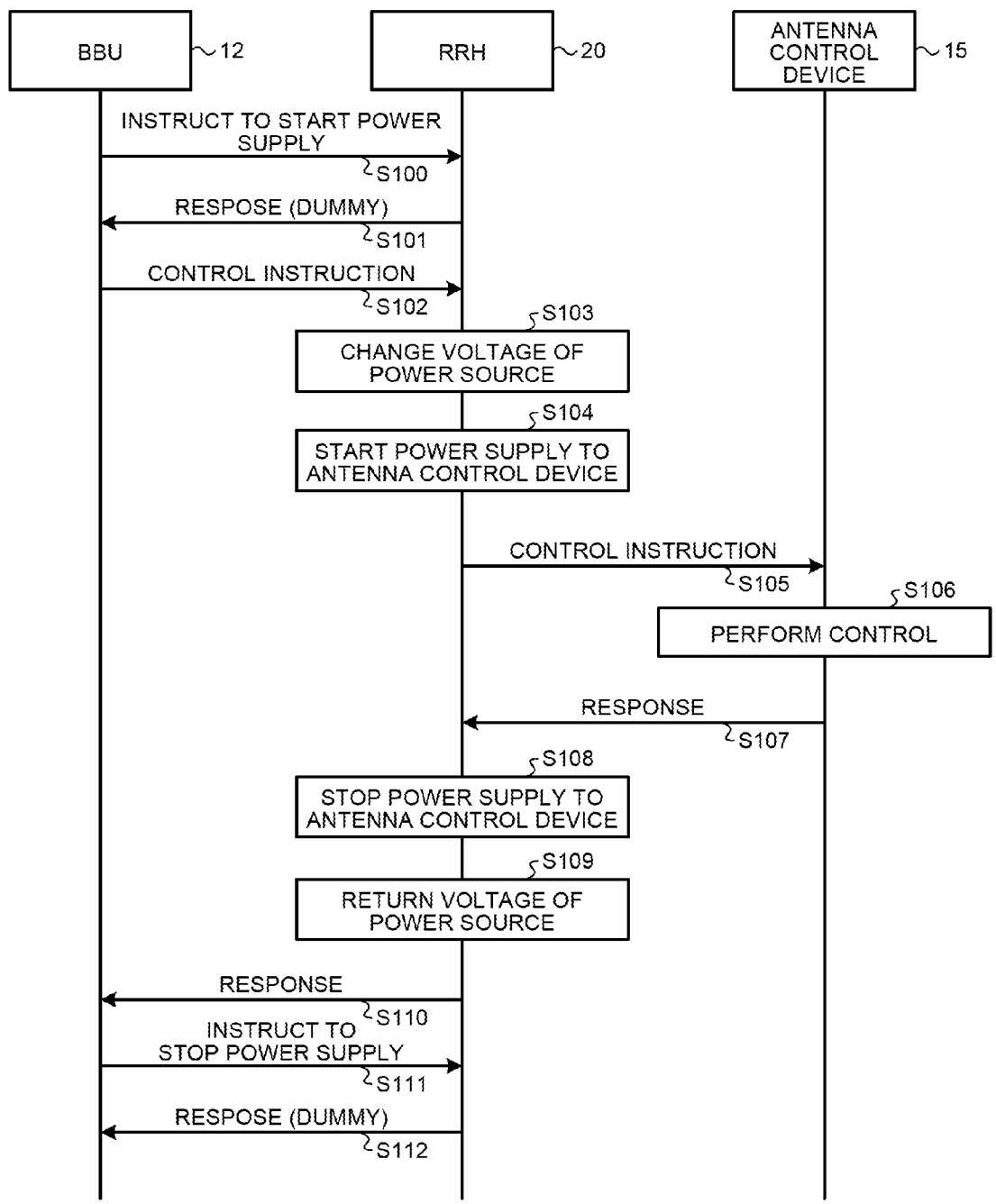
FIG. 3 is a sequence diagram illustrating an example of the operation of the base station system according to the first embodiment.

FIG. 3 is a sequence diagram illustrating an example of the operation of the base station system 10 according to the first embodiment. FIG. 3 illustrates a process in which the antenna control device 15 controls the antenna 16 in accordance with the message transmitted from the BBU 12. Furthermore, in the state before the start of the sequence illustrated in FIG. 3, the power supply device 200 of the RRH 20 generates the power source with the first voltage and supplies the generated power source with the first voltage to the PA 205.

First, the BBU 12 transmits, to the RRH 20, a message that instructs to start a power supply to the antenna control device 15 (Step S100). When the separating unit 32 in the RRH 20 receives, via the CPRI 202, the message that instructs to start the power supply, the separating unit 32 outputs the received message to the control unit 31. When the control unit 31 receives, from the separating unit 32, the message that instructs to start the power supply, the control unit 31 returns a dummy response to the BBU 12 via the CPRI 202 without starting the power supply to the antenna control device 15 (Step S101).

Then, the BBU 12 transmits, to the RRH 20, the message indicating a control instruction that instructs to control the antenna control device 15 (Step S102). When the separating unit 32 receives the message indicating the control instruction via the CPRI 202, the separating unit 32 outputs the received message to the control unit 31. When the control unit 31 receives the message indicating the control instruction from the separating unit 32, the control unit 31 instructs the power supply device 200 to generate the power source with the second voltage. The power supply device 200 changes the voltage of the generating power source from the first voltage to the second voltage (Step S103). Consequently, the PA 205 receives a supply of the power source with the second voltage.

Then, by supplying the generated power source with the second voltage to the antenna control device 15 via the AISG interface 201, the power supply device 200 starts the power supply to the antenna control device 15 (Step S104). Then, the control unit 31 transmits the message indicating the control instruction received from the BBU 12 at Step S102 to the antenna control device 15 via the AISG interface 201 (Step S105).

The antenna control device 15 performs control, such as tilt control or the like, of the antenna control device 15 in accordance with the control instruction included in the message received from the RRH 20 (Step S106). After the completion of the control of the antenna 16 in accordance with the control instruction, the antenna control device 15 transmits, to the RRH 20, the message that indicates the response to the control instruction (Step S107).

When the control unit 31 receives, via the AISG interface 201, the message that indicates the response transmitted from the antenna control device 15, the control unit 31 instructs the power supply device 200 to stop the power supply to the antenna control device 15. The power supply device 200 stops to supply the power source to the antenna control device 15 via the AISG interface 201 (Step S108). Then, the power supply device 200 returns the voltage of the power source that is being generated from the second voltage to the first voltage (Step S109). Consequently, the PA 205 receives a supply of the power source with the first voltage. Then, the control unit 31 transmits the message indicating the response received from the antenna control device 15 to the BBU 12 via the CPRI 202 (Step S110).

Then, the BBU 12 transmits, to the RRH 20, the message that instructs to stop the power supply to the antenna control device 15 (Step S111). When the separating unit 32 receives, via the CPRI 202, the message that instructs to stop the power supply, the separating unit 32 outputs the received message to the control unit 31. When the control unit 31 receives, from the separating unit 32, the message to instruct to stop the power supply, the control unit 31 returns a dummy response to the BBU 12 via the CPRI 202 without stopping the power supply to the antenna control device 15 (Step S112).

Advantage of the First Embodiment

When the RRH 20 according to the first embodiment operates the antenna control device 15, the RRH 20 allows the power supply device 200 to generate the power source with the second voltage and then supplies the generated power source to the antenna control device 15 and operates the PA 205 by the power source with the second voltage. Then, when the operation of the antenna control device 15 ends, the RRH 20 allows the power supply device 200 to generate the power source with the first voltage and supply the generated power source to the PA 205. Consequently, the power supply to the PA 205 and the power supply to the antenna control device 15 can be implemented by the single power supply device 200, the size and the weight of the RRH 20 can be reduced when compared to a case in which a power supply device is separately installed in each of the PA 205 and the antenna control device 15.

Furthermore, when the voltage of the power source supplied to the PA 205 is changed from the first voltage to the second voltage, there may be a case in which the gain of the PA 205 is decreased depending on the characteristics of the PA 205 and thus the power of the transmission signal output from the PA 205 is decreased. Thus, the RRH 20 according to the first embodiment does not change the voltage of the power source generated by the power supply device 200 at the stage in which the message that instructs to start the power supply from the BBU 12 to the antenna control device 15. Then, at the stage in which the message that indicates the control instruction is received, the RRH 20 changes the voltage of the power source generated by the power supply device 200. Furthermore, when the antenna control device 15 ends the control in accordance with the control instruction, the RRH 20 according to the first embodiment returns the voltage of the power source generated by the power supply device 200 to the original voltage before the message that instructs to stop the power supply from the BBU 12 to the antenna control device 15 is transmitted. Consequently, the RRH 20 can reduce the period of time for which the power of the transmission signal output from the PA 205 is decreased due to a decrease in the power-supply voltage supplied to the PA 205 from the first voltage to the second voltage.

Furthermore, when the RRH 20 according to the first embodiment receives the message that instructs to start the power supply from the BBU 12 to the antenna control device 15, the RRH 20 returns a dummy response to the BBU 12 without performing a process of starting the power supply. Furthermore, when the RRH 20 according to the first embodiment receives the message that instructs to stop the power supply from the BBU 12 to the antenna control device 15, the RRH 20 returns a dummy response to the BBU 12 without performing the process of stopping the power supply. Consequently, the RRH 20 can be operated in accordance with the sequence of messages in an existing AISG interface.

[b] Second Embodiment

In a second embodiment, when the power of the transmission signal output from the PA 205 is decreased due to a decrease in the power-supply voltage generated by the power supply device 200 from the first voltage to the second voltage, a decrease in the power of the transmission signal is suppressed by increasing the gain of the transmission signal that is input to the PA 205.

RRH 20

Figure 4:
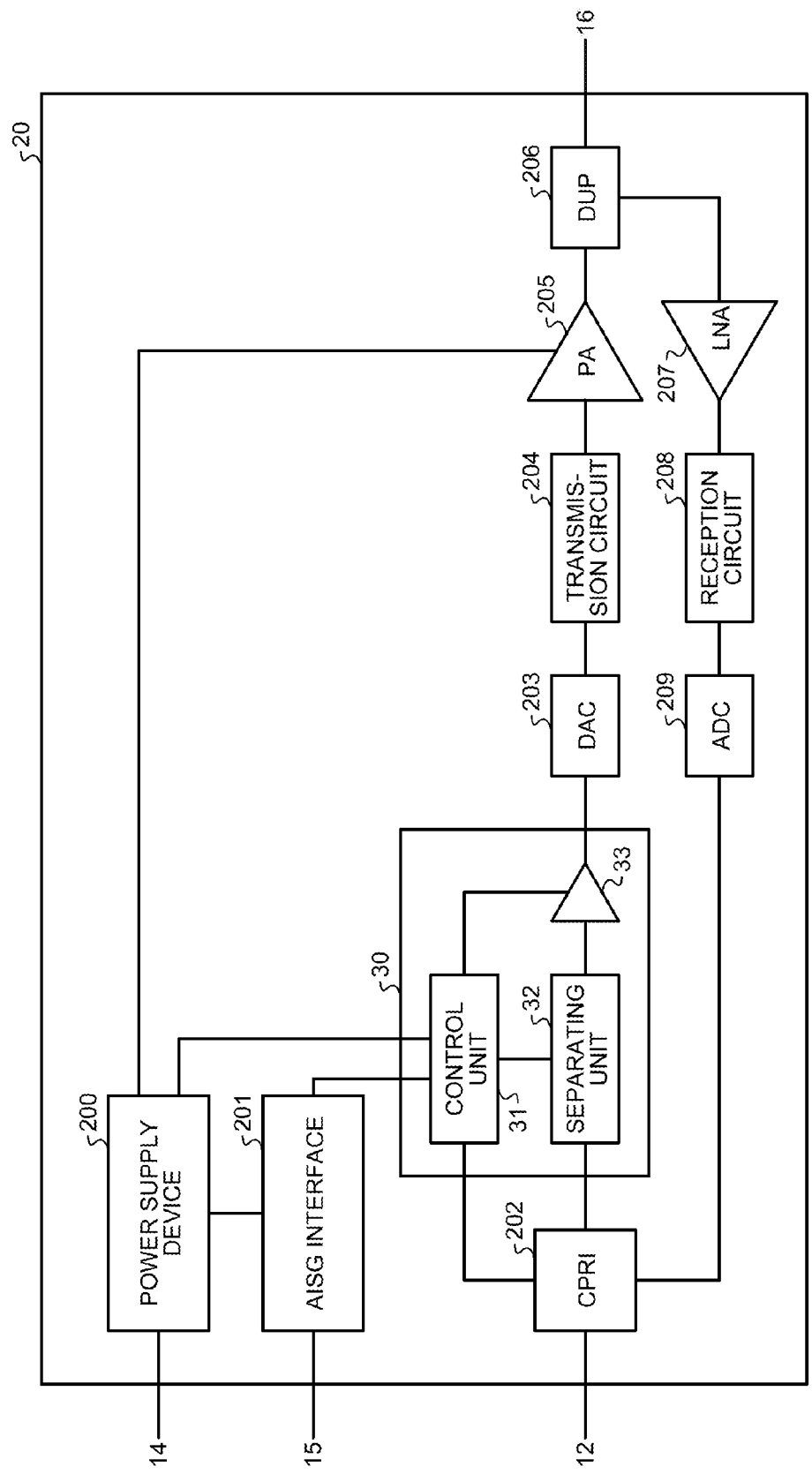
FIG. 4 is a block diagram illustrating an example of an RRH according to a second embodiment.

FIG. 4 is a block diagram illustrating an example of the RRH 20 according to a second embodiment. The RRH 20 according to the second embodiment differs from the RRH 20 according to the first embodiment described with reference to FIG. 2 in that an amplifier 33 is installed in the digital processing unit 30. The blocks illustrated in FIG. 4 having the same reference numerals as those illustrated in FIG. 2 have the same configuration or the similar functions as those illustrated in FIG. 2 except for the following points described below; therefore, descriptions thereof will be omitted.

The separating unit 32 outputs, to the amplifier 33, the transmission signal separated from the signal that is received from the BBU 12 via the CPRI 202. The amplifier 33 controls, in accordance with an instruction from the control unit 31, the gain of the transmission signal that is output from the separating unit 32.

When the control unit 31 receives the message that indicates the control instruction of the antenna control device 15 from the separating unit 32, the control unit 31 instructs the power supply device 200 to generate the power source with the second voltage. Then, the control unit 31 instructs the amplifier 33 to increase the gain of the transmission signal. Then, the control unit 31 transmits the message that indicates the control instruction received from the separating unit 32 to the antenna control device 15 via the AISG interface 201.

The gain instructed by the control unit 31 to the amplifier 33 is preferably the gain that increases the output power when, for example, the PA 205 is operated by the power source with the second voltage, to the same level as that of the output power when the PA 205 is operated by the power source with the first voltage. For the gain instructed by the control unit 31 to the amplifier 33, a value previously calculated on the basis of the maximum output power when the PA 205 is operated by the power source with the first voltage or the maximum output power when the PA 205 is operated by the power source with the second voltage.

Furthermore, when the control unit 31 receives, from the antenna control device 15 via the AISG interface 201, a response message that indicates the end of the control that is in accordance with the control instruction, the control unit 31 instructs the power supply device 200 to stop the power supply to the antenna control device 15. Then, the control unit 31 instructs the amplifier 33 to return the gain of the transmission signal to the original gain. Then, the control unit 31 instructs the power supply device 200 to generate the power source with the first voltage.

Figure 5:
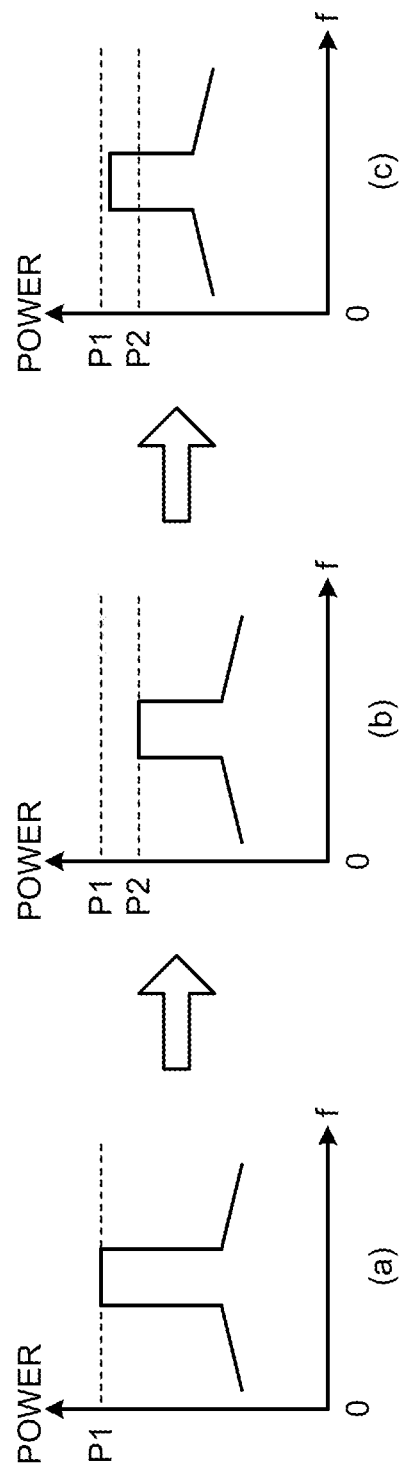
FIG. 5 is a schematic diagram illustrating an example of the spectrum of the signal that is output from a PA in the second embodiment.

FIG. 5 is a schematic diagram illustrating an example of the spectrum of the signal that is output from the PA 205 in the second embodiment. If the power source with the first voltage is supplied to the PA 205, the PA 205 transmits a signal with power P1 as illustrated in FIG. 5(a), for example.

However, if the voltage of the power source supplied to the PA 205 is decreased from the first voltage to the second voltage, the gain of the PA 205 is decreased and, as illustrated in FIG. 5(b), the power of the transmission signal output from the PA 205 is decreased from P1 to P2, for example. Consequently, the radius of the cell covered by the RRH 20 is reduced and thus the communication quality of the terminal device located on the edge of the cell is degraded.

Accordingly, with the RRH 20 according to the second embodiment, when the voltage of the power source supplied to the PA 205 is decreased from the first voltage to the second voltage, the gain of the transmission signal that is input to the PA 205 is allowed to be increased. Consequently, the RRH 20 can increase the power of the transmission signal that is output from the PA 205 greater than P2, as illustrated in FIG. 5(c), for example. Thus, the RRH 20 can keep the effect on communication low, which the effect is caused by a decrease in the voltage of the power source from the first voltage to the second voltage supplied to the PA 205.

Operation of the Base Station System 10

Figure 6:
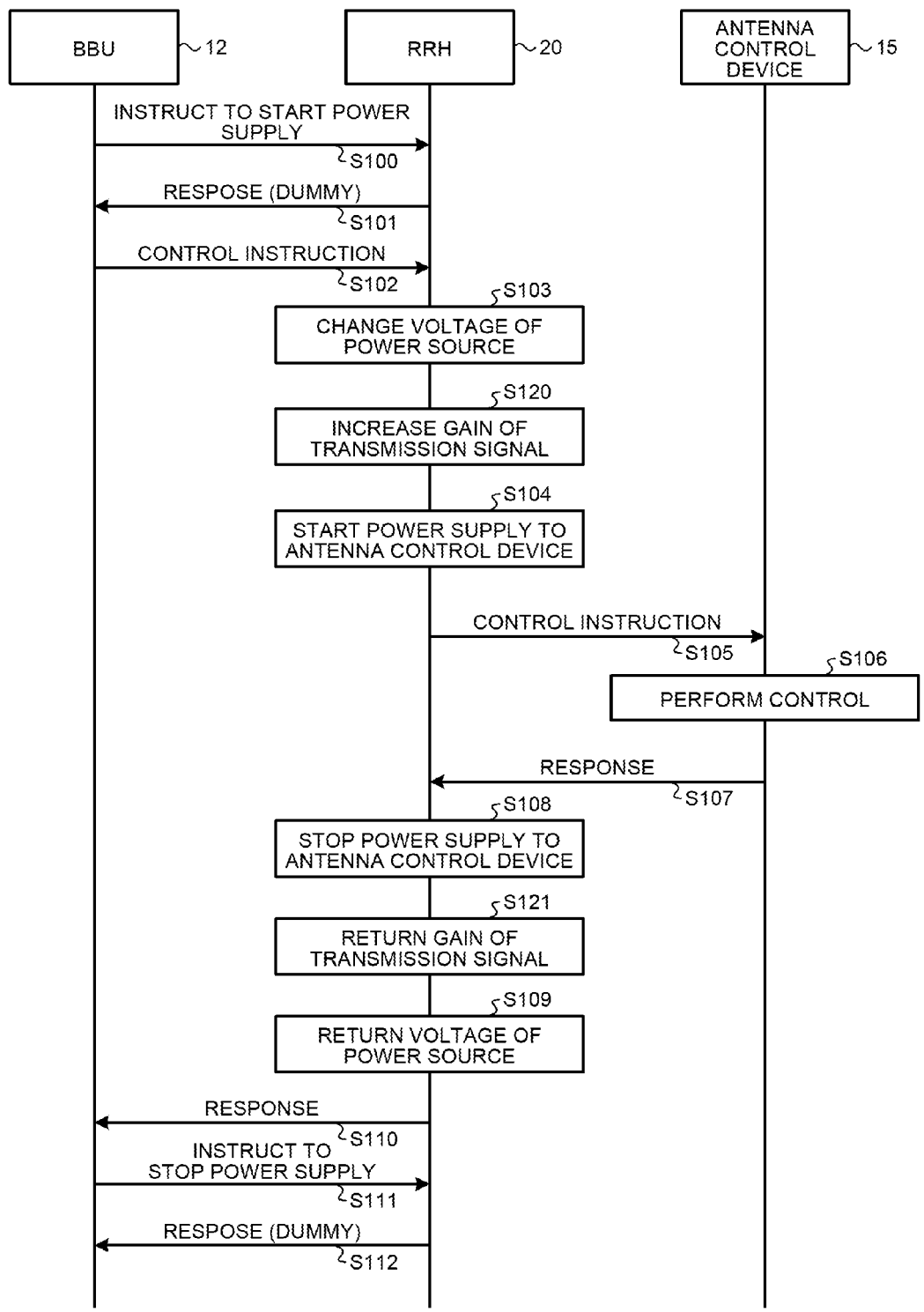
FIG. 6 is a sequence diagram illustrating an example of the operation of a base station system according to the second embodiment.

FIG. 6 is a sequence diagram illustrating an example of the operation of the base station system 10 according to the second embodiment. The processes illustrated in FIG. 6 having the same reference numerals as those illustrated in FIG. 3 have the same processes as those illustrated in FIG. 3 except for the following points described below; therefore, descriptions thereof will be omitted.

When the power supply device 200 changes the voltage of the power source from the first voltage to the second voltage (Step S103), the control unit 31 instructs the amplifier 33 to increase the gain of the transmission signal. The amplifier 33 increases the gain of the transmission signal in accordance with the instruction from the control unit 31 (Step S120). Consequently, the amplitude of the transmission signal that is input to the PA 205 is increased and it is possible to suppress a decrease in the output due to a decrease in the voltage of power source supplied to the PA 205.

Furthermore, when the power supply device 200 stops the power supply to the antenna control device 15 (Step S108), the control unit 31 instructs the amplifier 33 to return the gain of the transmission signal to the original. The amplifier 33 returns the gain of the transmission signal to the original in accordance with the instruction from the control unit 31 (Step S121).

Advantage of the Second Embodiment

With the RRH 20 according to the second embodiment, it is possible to suppress a decrease in the power of the transmission signal when the voltage of power source generated by the power supply device 200 is decreased from the first voltage to the second voltage. Consequently, it is possible to keep the effect on communication low, which the effect is caused by a decrease in the voltage of the power source supplied to the PA 205.

[c] Third Embodiment

The RRH 20 according to the third embodiment differs from the RRH 20 according to the first embodiment in that, when the power of the transmission signal that is output from the PA 205 is equal to or less than predetermined power, the voltage of power source of the PA 205 is made to be decreased from the first voltage to the second voltage.

RRH 20

Figure 7:
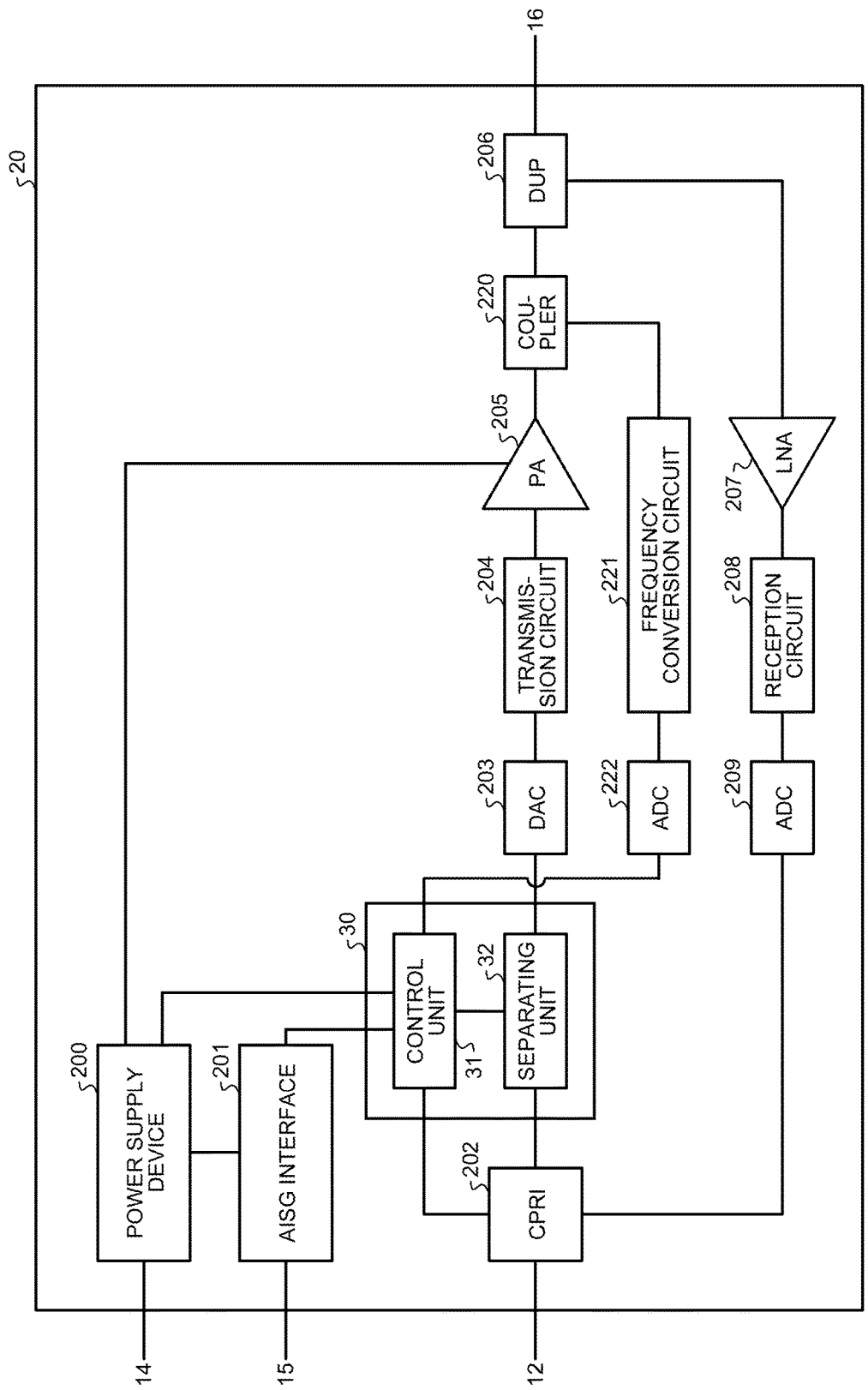
FIG. 7 is a block diagram illustrating an example of an RRH according to a third embodiment.

FIG. 7 is a block diagram illustrating an example of the RRH 20 according to a third embodiment. The RRH 20 according to the third embodiment includes a coupler 220, a frequency conversion circuit 221, and an ADC 222. The blocks illustrated in FIG. 7 having the same reference numerals as those illustrated in FIG. 2 have the same configuration or the similar functions as those illustrated in FIG. 2 except for the following points described below; therefore, descriptions thereof will be omitted.

The coupler 220 feeds back, to the frequency conversion circuit 221, a part of the transmission signal output from the PA 205. The frequency conversion circuit 221 down converts, to the baseband, the transmission signal with the frequency of the high frequency band that was fed back from the coupler 220. The ADC 222 converts the analog transmission signal, which is down converted to the baseband by the frequency conversion circuit 221, to a digital transmission signal and outputs the signal to the control unit 31.

When the control unit 31 receives a message that indicates the control instruction of the antenna control device 15 from the separating unit 32, the control unit 31 measures, on the basis of the signal output from the ADC 222, the power of the transmission signal output from the PA 205. Here, when the communication traffic is increased, the power of the transmission signal output from the PA 205 is increased, whereas, when the communication traffic is decreased, the power of the transmission signal output from the PA 205 is decreased.

When the power of the transmission signal output from the PA 205 is equal to or less than the predetermined power, the control unit 31 instructs the power supply device 200 to generate the power source with the second voltage. The predetermined power is given by, for example, the relative value from the normal rated power of the transmission signal output from the PA 205.

Operation of the RRH 20

Figure 8:
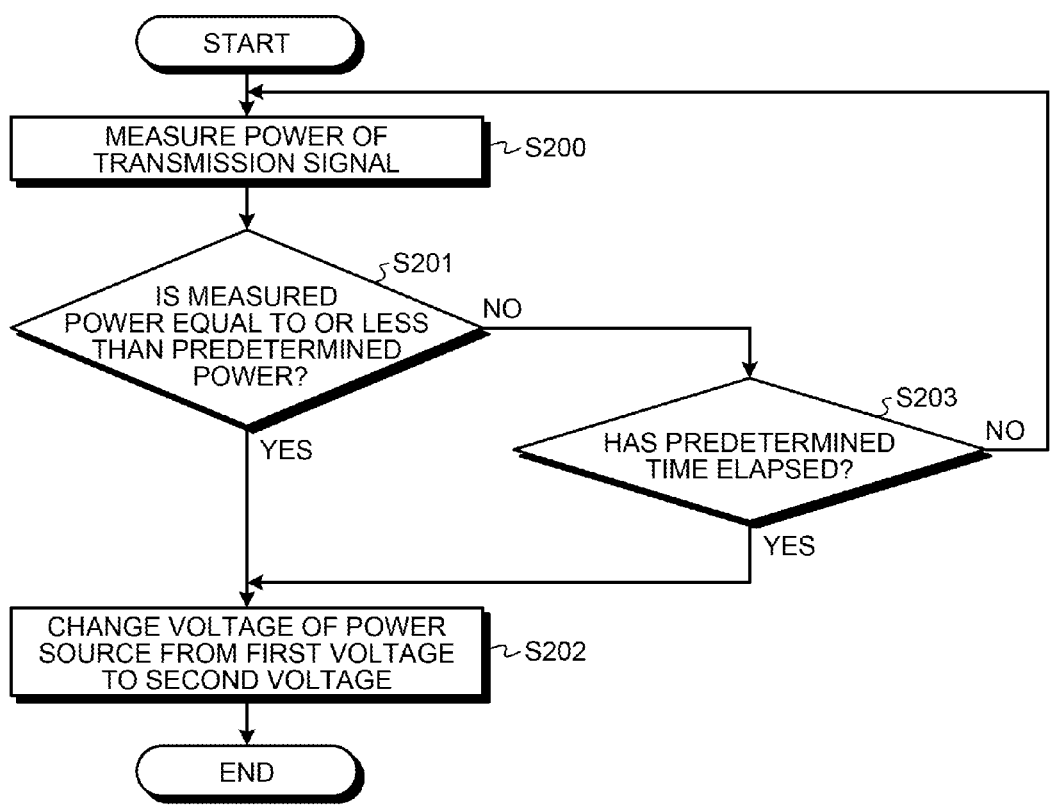
FIG. 8 is a flowchart illustrating an example of a change process of a voltage of power source performed by an RRH according to the third embodiment.

FIG. 8 is a flowchart illustrating an example of a change process of a power-supply voltage performed by the RRH 20 according to the third embodiment. The RRH 20 according to the third embodiment is operated in the same manner as the RRH 20 illustrated in the sequence diagram in FIG. 3. Furthermore, the flowchart illustrated in FIG. 8 indicates a detailed process performed at Step S103 illustrated in FIG. 3.

First, when the control unit 31 receives the message that indicates the control instruction of the antenna control device 15 from the separating unit 32, the control unit 31 measures, on the basis of the output from the ADC 222, the power of the transmission signal output from the PA 205 (Step S200). Then, the control unit 31 determines whether the power of the transmission signal output from the PA 205 is equal to or less than the predetermined power (Step S201).

If the power of the transmission signal that is output from the PA 205 is equal to or less than the predetermined power (Yes Step S201), the control unit 31 instructs the power supply device 200 to generate the power source with the second voltage. The power supply device 200 changes the voltage of the generating power source from the first voltage to the second voltage (Step S202).

In contrast, if the power of the transmission signal that is output from the PA 205 is equal to or greater than the predetermined power (No at Step S201), the control unit 31 determines whether the predetermined time has elapsed since the control unit 31 received the message indicating the control instruction from the separating unit (Step S203). If the predetermined time has not elapsed (No at Step S203), the control unit 31 again performs the process indicated by Step S200. In contrast, if the predetermined time has elapsed (Yes at Step S203), the control unit 31 performs the process indicated by Step S202.

Advantage of the Third Embodiment

With the RRH 20 according to the third embodiment, when the communication traffic is small and the power of the transmission signal output from the PA 205 is low, the voltage of power source supplied to the PA 205 is allowed to be decreased from the first voltage to the second voltage. Consequently, the RRH 20 can reduce the number of terminal device whose communication quality is deteriorated due to a decrease in the output of the PA 205.

[d] Fourth Embodiment

The RRH 20 according to the fourth embodiment differs from the RRH 20 according to the first embodiment in that, when the voltage of power source of the PA 205 is decreased from the first voltage to the second voltage, the RRH 20 according to the fourth embodiment decreases the voltage of power source of the PA 205 in stages at intervals of predetermined time. In the fourth embodiment, the configuration of the RRH 20 is the same as that of the RRH 20 according to the first embodiment with reference to FIG. 2 except for the following points described below; therefore, descriptions thereof will be omitted.

Operation of the RRH 20

Figure 9:
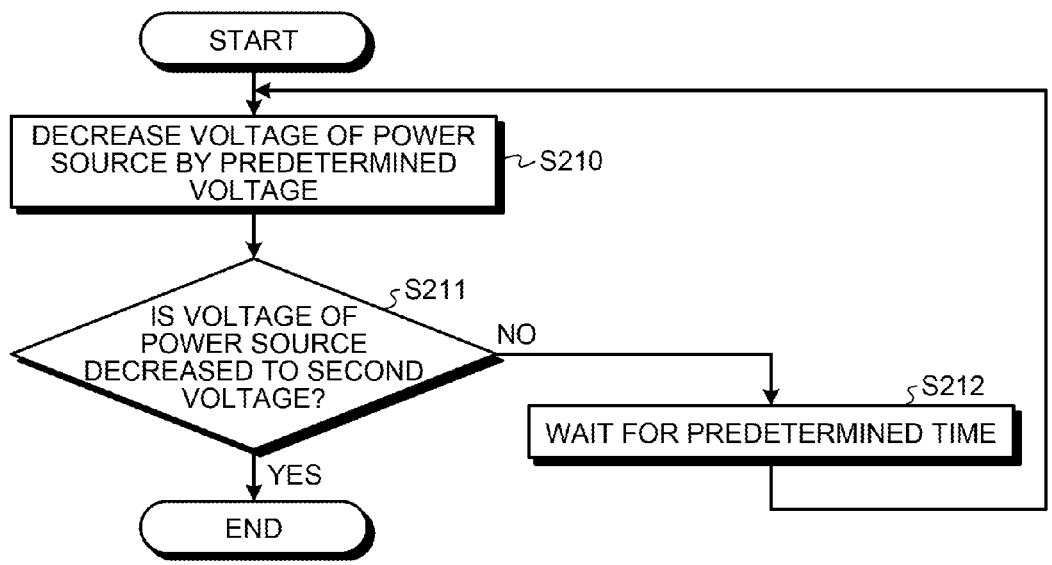
FIG. 9 is a flowchart illustrating an example of a change process of a voltage of power source performed by an RRH according to a fourth embodiment.

FIG. 9 is a flowchart illustrating an example of a change process of a voltage of power source performed by the RRH 20 according to a fourth embodiment. The RRH 20 according to the fourth embodiment is operated in the same manner as the RRH 20 illustrated in the sequence diagram in FIG. 3. Furthermore, the flowchart illustrated in FIG. 9 indicates a detailed process performed at Step S103 illustrated in FIG. 3.

First, when the control unit 31 receives the message that indicates the control instruction of the antenna control device 15 from the separating unit 32, the control unit 31 instructs the power supply device 200 to decrease the voltage of the power source generated by the power supply device 200 by a predetermined voltage (for example, 1 V). The power supply device 200 decreases, by the predetermined voltage in accordance with the instruction from the control unit 31, the voltage of power source to be generated (Step S210). Consequently, the voltage of power source supplied to the PA 205 is decreased by the predetermined voltage.

Then, by decreasing the voltage of power source in stages by the predetermined voltage from the first voltage, the control unit 31 determines whether the voltage of power source is decreased to the second voltage (Step S211). The control unit 31 determines, on the basis of, for example, the value of the predetermined voltage and the number of times the instruction to decrease the voltage of power source by the predetermined voltage is sent to the power supply device 200, whether the voltage of power source is decreased to the second voltage.

If the voltage of power source is decreased to the second voltage (Yes at Step S211), the RRH 20 ends the operation illustrated in the flowchart. In contrast, if the voltage of power source is not decreased to the second voltage (No at Step S211), the control unit 31 waits for a predetermined time (Step S212) and again performs the process indicated by Step S210.

Figure 10:
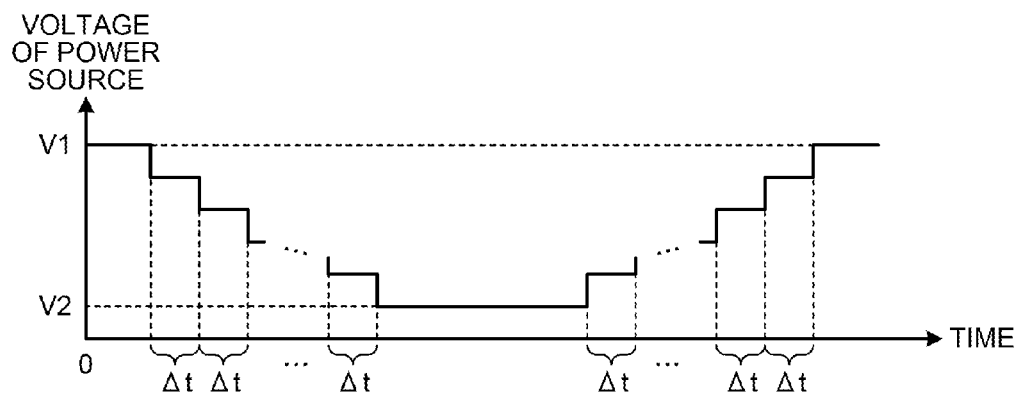
FIG. 10 is a schematic diagram illustrating an example of a change in a voltage of power source according to the fourth embodiment.

As described above, by gradually decreasing the voltage of power source by the predetermined voltage every predetermined time, the voltage of the power source supplied to the PA 205 is changed to the state illustrated in, for example, FIG. 10. FIG. 10 is a schematic diagram illustrating an example of a change in a voltage of power source according to the fourth embodiment. The voltage of power source supplied to the PA 205 is decreased in stages as illustrated in, for example, FIG. 10, by the predetermined voltage from a first voltage V1 to a second voltage V2 every predetermined time $\Delta t$. Consequently, a decrease in the output power of the PA 205 in accordance with a decrease in the voltage of the power source is moderated and it is possible to give communicating terminal devices time to perform handover to a cell having better quality. Consequently, it is possible to suppress communication disconnection of the terminal device that is currently in communication.

Furthermore, when the control unit 31 instructs to return the voltage of the power source from the second voltage V2 to the first voltage V1 after the antenna control device 15 controlled the antenna 16, it is preferable that the control unit 31 increase the voltage in stages, as illustrated in, for example, FIG. 10, by the predetermined voltage every predetermined time $\Delta t$. Consequently it is possible to prevent the occurrence of communication disconnection of the terminal device in the adjacent cell due to rapid increase of the interference radio wave to an adjacent cell.

Advantage of the Fourth Embodiment

With the RRH 20 according to the fourth embodiment, it is possible to suppress communication disconnection of a terminal device caused by a decrease in the power output from the PA 205.

[e] Fifth Embodiment

The fifth embodiment differs from the second embodiment in that, when the gain of the transmission signal is increased after the voltage of power source of the PA 205 is decreased, the gain of the transmission signal is increased, while monitoring the out-of-band radiation of the transmission signal that is output from the PA 205, within the range in which the out-of-band radiation satisfies the standard value.

RRH 20

Figure 11:
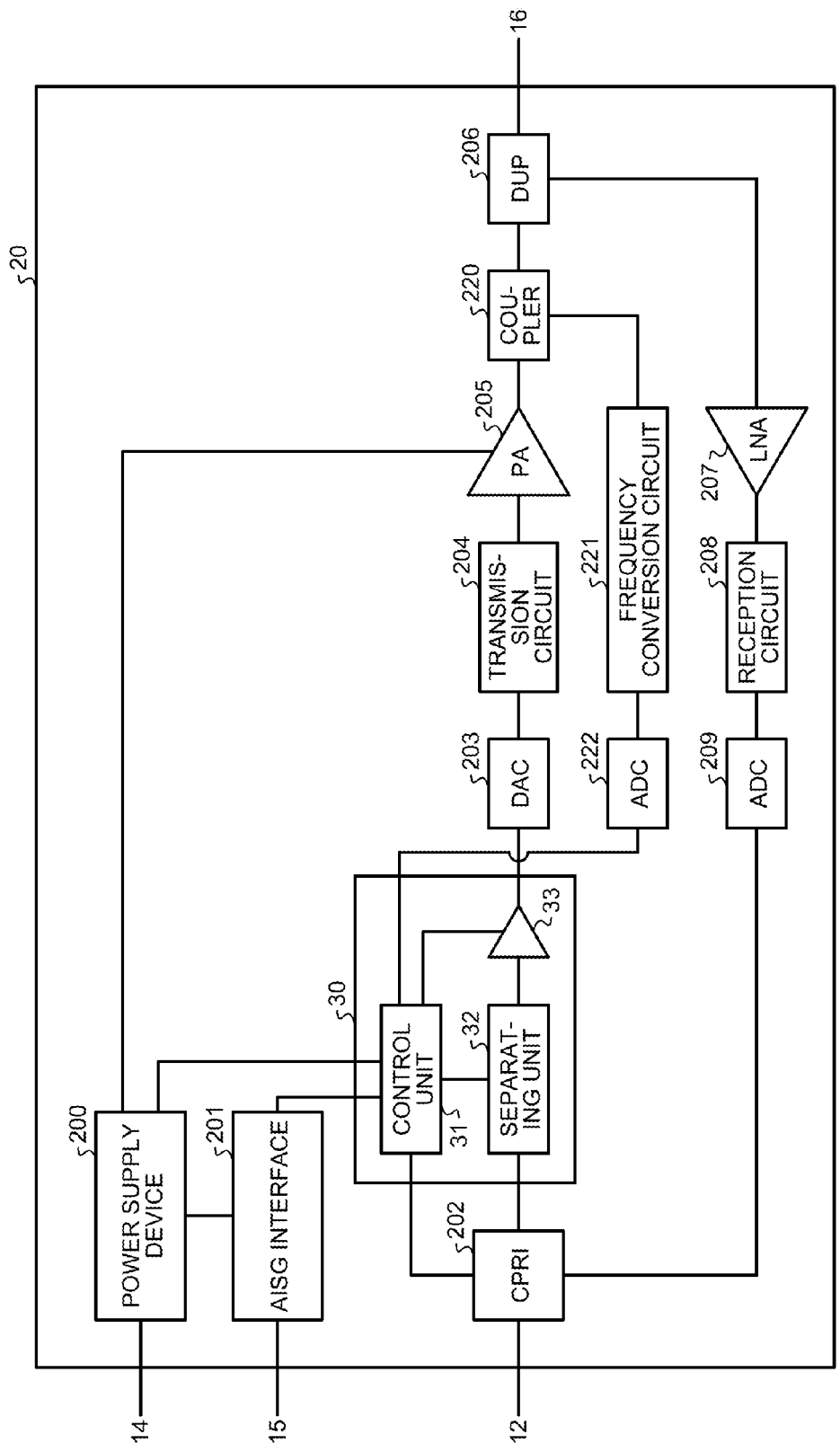
FIG. 11 is a block diagram illustrating an example of an RRH according to a fifth embodiment.

FIG. 11 is a block diagram illustrating an example of the RRH 20 according to a fifth embodiment. The RRH 20 according to the fifth embodiment includes the coupler 220, the frequency conversion circuit 221, and the ADC 222. Furthermore, the digital processing unit 30 according to the fifth embodiment includes the amplifier 33. Furthermore, the blocks illustrated in FIG. 11 having the same reference numerals as those illustrated in FIG. 4 or 7 have the same configuration or the similar functions as those illustrated in FIG. 4 or 7 except for the following points described below; therefore, descriptions thereof will be omitted.

When the control unit 31 receives the message that indicates the control instruction of the antenna control device 15 from the separating unit 32, the control unit 31 instructs the power supply device 200 to decrease the voltage of the power source generated by the power supply device 200 by the predetermined voltage (for example, 1 V). Then, the control unit 31 instructs the amplifier 33 to increase the gain of the transmission signal by a predetermined amount. The increase amount of the gain instructed by the control unit 31 corresponds to the increase amount of the gain obtained so as to compensate, for example, the power of the transmission signal received from the PA 205 in which the voltage of power source is decreased by the predetermined voltage.

Then, the control unit 31 performs Fast Fourier Transform (FFT) on the transmission signal output from the ADC 222 and measures, on the basis of the transformed signal, the power of the out-of-band radiation. If the power of the out-of-band radiation exceeds the standard value, the control unit 31 instructs the amplifier 33 to decrease the gain of the transmission signal by a predetermined amount (for example, 0.5 dB).

Operation of the RRH 20

Figure 12:
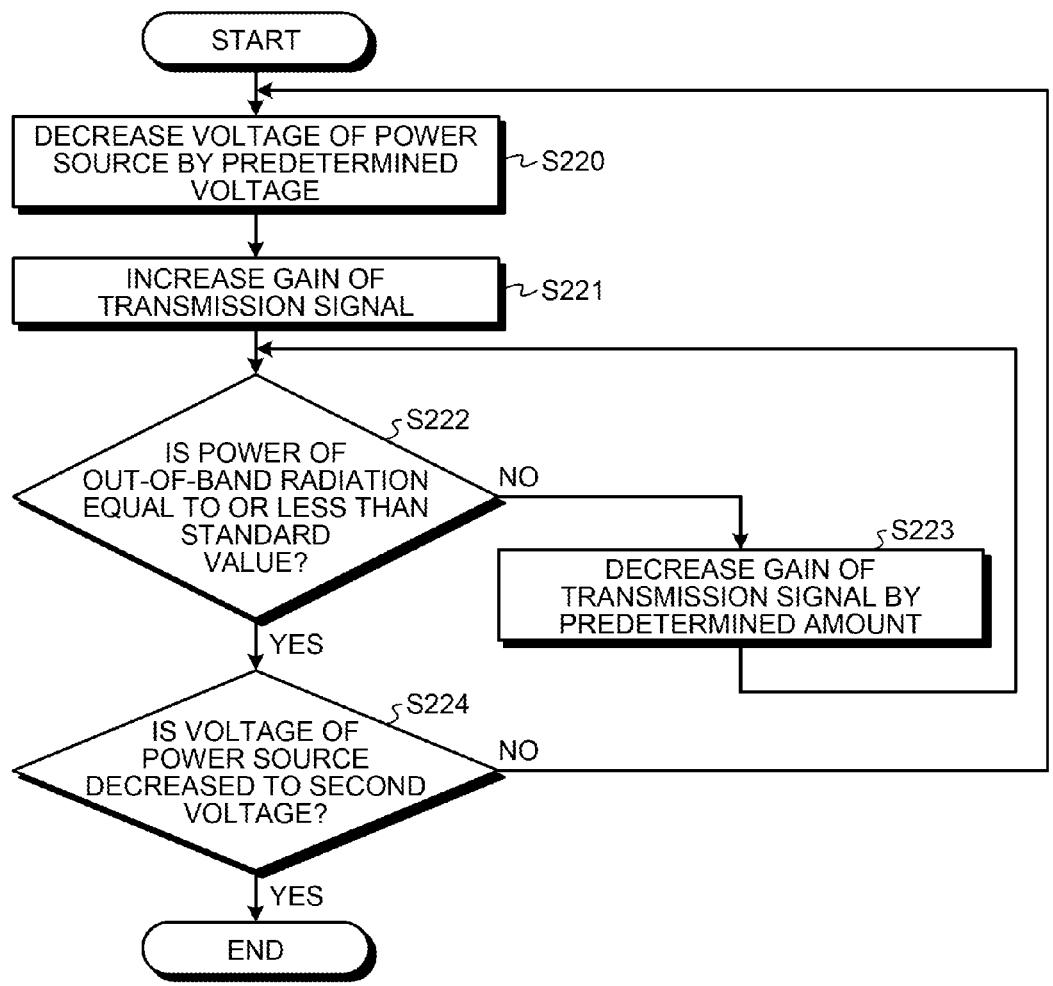
FIG. 12 is a flowchart illustrating an example of a change process of a voltage of power source performed by the RRH according to the fifth embodiment.

FIG. 12 is a flowchart illustrating an example of a change process of a voltage of power source performed by the RRH 20 according to the fifth embodiment. The RRH 20 according to the fifth embodiment is operated in the same manner as the RRH 20 illustrated in the sequence diagram in FIG. 3. Furthermore, the flowchart illustrated in FIG. 12 indicates a detailed process performed at Step S103 illustrated in FIG. 3.

First, when the control unit 31 receives the message that indicates the control instruction of the antenna control device 15 from the separating unit 32, the control unit 31 instructs the power supply device 200 to decrease the voltage of the power source generated by the power supply device 200 by the predetermined voltage (for example, 1 V). In response to the instruction from the control unit 31, the power supply device 200 decreases the voltage of power source to be generated by the predetermined voltage (Step S220). Consequently, the voltage of power source supplied to the PA 205 is decreased by the predetermined voltage.

Then, the control unit 31 instructs the amplifier 33 to increase the gain of the transmission signal by a predetermined amount. In response to the instruction from the control unit 31, the amplifier 33 increases the gain of the transmission signal by a predetermined amount (Step S221). Then, by performing FFT conversion on the transmission signal that is output from the ADC 222, the control unit 31 measures the power of the out-of-band radiation. Then, the control unit 31 determines whether the power of the out-of-band radiation is equal to or less than the standard value (Step S222).

If the power of the out-of-band radiation exceeds the standard value (No at Step S222), the control unit 31 instructs the amplifier 33 to decrease the gain of the transmission signal by the predetermined amount. In response to the instruction from the control unit 31, the amplifier 33 decreases the gain of the transmission signal by the predetermined amount (Step S223). Then, the control unit 31 again performs the process indicated by Step S222.

In contrast, if the power of the out-of-band radiation is equal to or less than the standard value (Yes at Step S222), the control unit 31 determines whether the voltage of power source generated by the power supply device 200 is decreased to the second voltage (Step S224). If the voltage of power source is not decreased to the second voltage (No at Step S224), the control unit 31 again performs the process indicated by Step S220. In contrast, if the voltage of power source is decreased to the second voltage (Yes at Step S224), the RRH 20 ends the processes illustrated in the flowchart.

Figure 13:
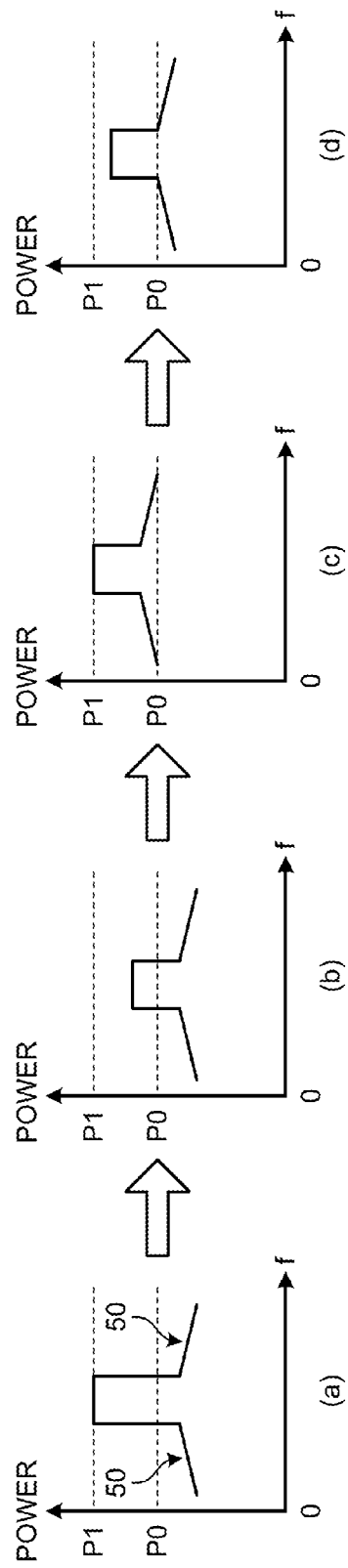
FIG. 13 is a schematic diagram illustrating an example of the spectrum of the signal that is output from a PA in the fifth embodiment.

FIG. 13 is a schematic diagram illustrating an example of the spectrum of the signal that is output from the PA 205 in the fifth embodiment. When the power source with the first voltage is supplied to the PA 205, the PA 205 transmits the transmission signal with the predetermined power P1, as illustrated in FIG. 13(a), for example. The PA 205 is adjusted such that, when the PA 205 is operated by the power source with the first voltage, the power of out-of-band radiation 50 in the transmission signal falls below a standard value P0.

Then, when the voltage of the power source supplied to the PA 205 is decreased by a predetermined voltage, the gain of the PA 205 is decreased and, as illustrated in FIG. 13(b) for example, the power of the transmission signal output from the PA 205 is decreased. Then, when the gain of the transmission signal that is input to the PA 205 is increased by a predetermined amount, as illustrated in FIG. 13(c) for example, the power of the transmission signal output from the PA 205 is increased. However, by increasing the gain of the transmission signal that is input to the PA 205 by a predetermined amount, as illustrated in FIG. 13(c) for example, the power of the out-of-band radiation 50 in the transmission signal that is output from the PA 205 may exceed the standard value P0.

When the power of the out-of-band radiation 50 in the transmission signal that is output from the PA 205 exceeds the standard value P0, as illustrated in FIG. 13(c) for example, the control unit 31 controls the amplifier 33 and gradually decreases the gain of the transmission signal by a predetermined amount until the power of the out-of-band radiation 50 falls below the standard value P0. Consequently, the RRH 20 can increase the power of the transmission signal that is output from the PA 205 within the range in which the power of the out-of-band radiation 50 does not exceed the standard value P0.

Advantage of the fifth embodiment

The RRH 20 according to the fifth embodiment can increase the power of the transmission signal that is output from the PA 205, while monitoring the power of the out-of-band radiation 50 in the transmission signal that is actually output from the PA 205, within the range in which power of the out-of-band radiation 50 does not exceeds the standard value P0.

[f] Sixth Embodiment

The RRH 20 according to a sixth embodiment differs from the RRH 20 according to the second embodiment in that, when the voltage of power source of the PA 205 is decreased, by increasing the gain of the PA 205, the RRH 20 suppresses a decrease in the power of the transmission signal that is output from the PA 205.

RRH 20

Figure 14:
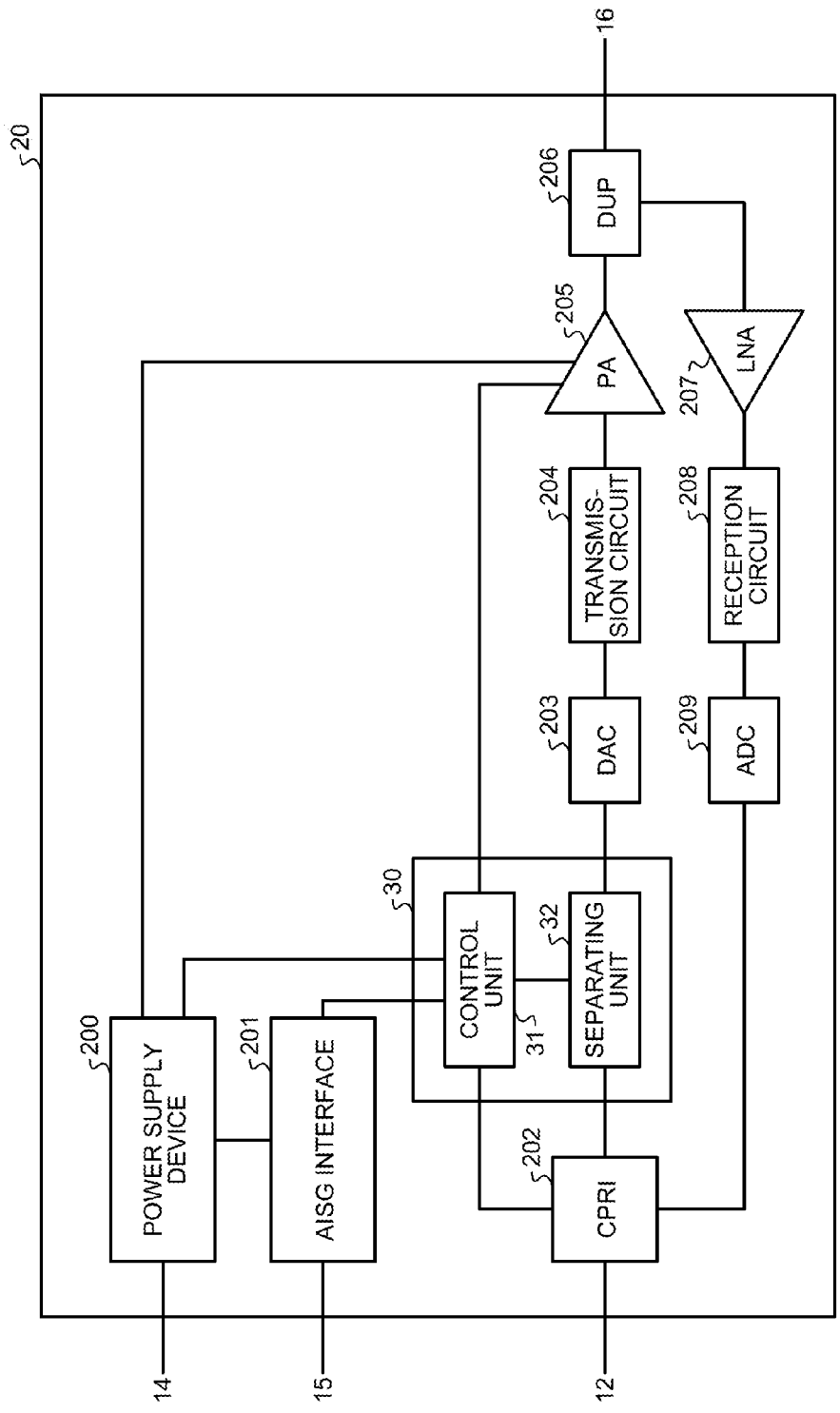
FIG. 14 is a block diagram illustrating an example of an RRH according to a sixth embodiment.

FIG. 14 is a block diagram illustrating an example of the RRH 20 according to a sixth embodiment. The blocks illustrated in FIG. 14 having the same reference numerals as those illustrated in FIG. 2 have the same configuration or the similar functions as those illustrated in FIG. 2 except for the following points described below; therefore, descriptions thereof will be omitted. Furthermore, the RRH 20 according to the sixth embodiment is operated in the same manner as the RRH 20 illustrated in the sequence diagram in FIG. 3 except for the following points described below.

When the control unit 31 receives the message that indicates the control instruction of the antenna control device 15 from the separating unit 32, the control unit 31 instructs the power supply device 200 to generate the power source with the second voltage. Then, by controlling the gate voltage of the PA 205 and increasing the drain current of the PA 205, the control unit 31 increases the gain of the PA 205.

Advantage of the Sixth Embodiment

With the RRH 20 according to the sixth embodiment, when the voltage of power source generated by the power supply device 200 is decreased from the first voltage to the second voltage, the RRH 20 can suppress a decrease in the power of the transmission signal that is output from the PA 205. Consequently, it is possible to keep the effect on communication low, which the effect is caused by a decrease in the voltage of the power source supplied to the PA 205.

Here, the method in the second embodiment that compensates a decrease in the power of the transmission signal that is output from the PA 205 by increasing the gain in the digital processing unit 30 is effective if a margin in the dynamic range of the transmission signal in the digital processing unit 30 is present. However, if a margin is insufficient in the dynamic range of the transmission signal due to an increase in the gain in the digital processing unit 30, there may be a case in which a process of distortion compensation or failure monitoring is affected. Consequently, it is preferable to increase the transmission signal in an analog unit (the PA 205 in the sixth embodiment) without increasing the gain in the digital processing unit 30.

Furthermore, in the RRH 20 according to the sixth embodiment, it is conceivable that, by increasing the gain of the PA 205, the out-of-band radiation is also increased even though the power of the transmission signal output from the PA 205 is increased. Accordingly, for example, as described in the fifth embodiment, it is preferable to increase the gain of the PA 205, while monitoring the out-of-band radiation included in the transmission signal that is actually output from the PA 205, within the range in which the power of the out-of-band radiation does not exceed the standard value.

Furthermore, the RRH 20 according to the sixth embodiment compensates, by increasing the gain of the PA 205, a decrease in the power of the transmission signal due to a decrease in the voltage of the power source supplied to the PA 205; however, as further described in the second embodiment, the RRH 20 may also increase the gain of the transmission signal that is input to the PA 205.

[g] Seventh Embodiment

A seventh embodiment differs from the first embodiment in that, when the voltage of power source of the PA 205 is decreased in the RRH 20 that includes a plurality of transmission unit each of which includes the PA 205, the power of the transmission signal is increased by combining each of the transmission signals amplified by the PA 205 included in each of the transmission units.

RRH 20

Figure 15:
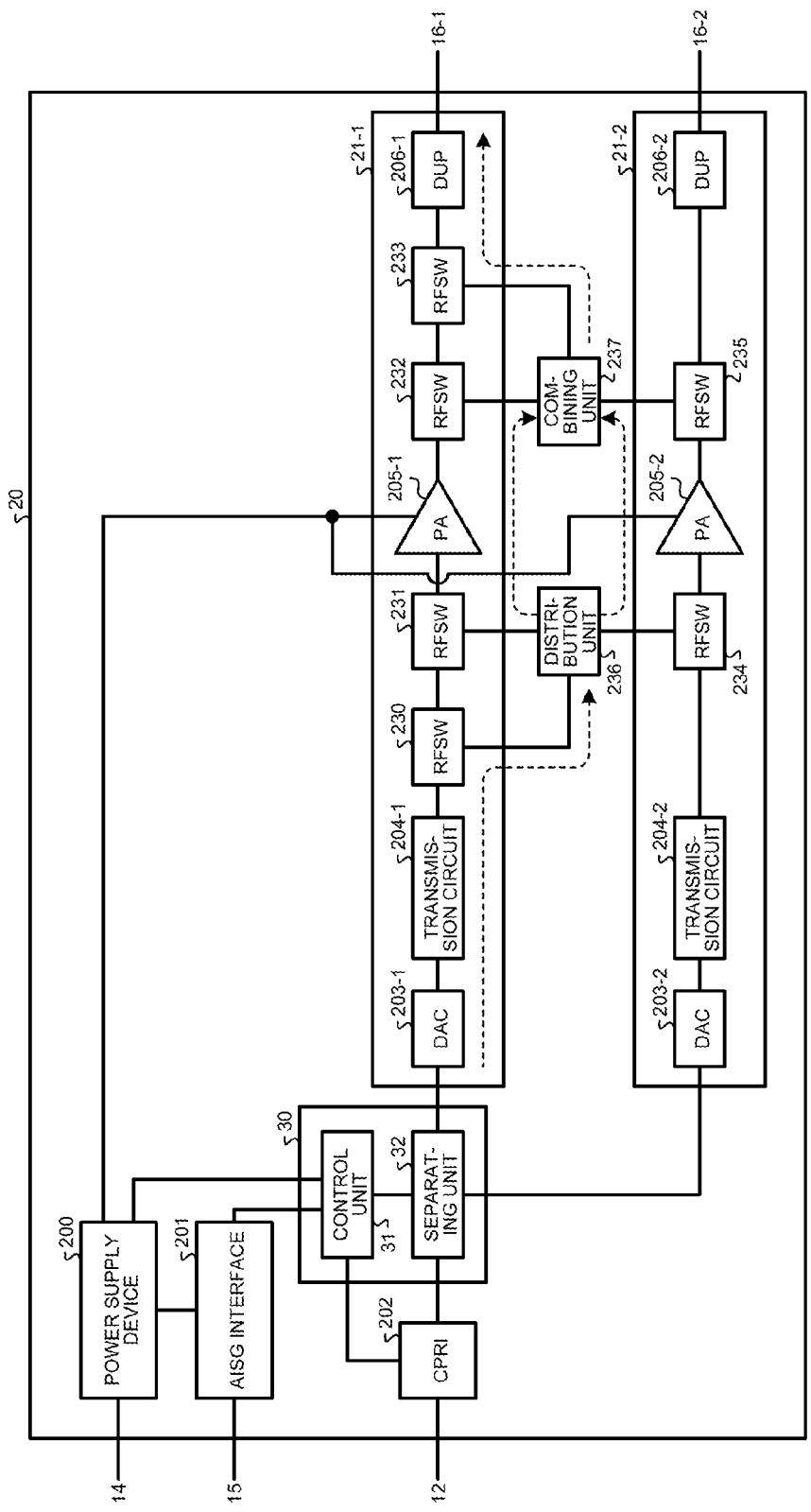
FIG. 15 is a block diagram illustrating an example of an RRH according to a seventh embodiment.

FIG. 15 is a block diagram illustrating an example of the RRH 20 according to a seventh embodiment. The RRH 20 according to the seventh embodiment includes a plurality of antennas 16-1 and 16-2 and can perform transmitter diversity or MIMO (Multiple Input and Multiple Output) transmission by using the antennas 16-1 and 16-2. FIG. 15 exemplifies the RRH 20 that includes two antennas 16; however, the number of antennas 16 included in the RRH 20 may also be 3 or more.

The RRH 20 includes a transmission unit 21-1, a transmission unit 21-2, a distribution unit 236, and a combining unit 237. The transmission unit 21-1 is connected to the antenna 16-1 and the transmission unit 21-2 is connected to the antenna 16-2. Furthermore, in the RRH 20 exemplified in FIG. 15, the blocks mainly related to transmission are illustrated and the blocks related to reception are omitted. Furthermore, The blocks illustrated in FIG. 15 having the same reference numerals as those illustrated in FIG. 2 have the same configuration or the similar functions as those illustrated in FIG. 2 except for the following points described below; therefore, descriptions thereof will be omitted.

The transmission unit 21-1 includes a DAC 203-1, a transmission circuit 204-1, a PA 205-1, a DUP 206-1, an RFSW 230, an RFSW 231, an RFSW 232, and an RFSW 233. The RFSW 230 switches, in accordance with an instruction from the control unit 31, the output destination of the transmission signal processed by the transmission circuit 204-1 to one of the RFSW 231 and the distribution unit 236. The RFSW 231 outputs, to the PA 205-1 in accordance with the instruction from the control unit 31, one of the output from the RFSW 230 and the output from the distribution unit 236. The RFSW 232 switches, in accordance with the instruction from the control unit 31, the output destination of the transmission signal amplified by the PA 205-1 to one of the RFSW 233 and the combining unit 237. The RFSW 233 outputs, to the DUP 206-1 in accordance with the instruction from the control unit 31, one of the output from the RFSW 232 and the output from the combining unit 237.

The transmission unit 21-2 includes a DAC 203-2, a transmission circuit 204-2, a PA 205-2, a DUP 206-2, an RFSW 234, and an RFSW 235. The RFSW 234 outputs, to the PA 205-2 in accordance with the instruction from the control unit 31, one of the output from the transmission circuit 204-2 and the output from the distribution unit 236. The RFSW 235 switches, in accordance with the instruction from the control unit 31, the output destination of the transmission signal amplified by the PA 205-2 to one of the DUP 206-2 and the combining unit 237.

The distribution unit 236 distributes, in accordance with the instruction from the control unit 31, the transmission signal that is output from the RFSW 230 to the RFSW 231 and the RFSW 234. The combining unit 237 combines, in accordance with the instruction from the control unit 31, the transmission signal that is output from the RFSW 232 with the transmission signal that is output from the RFSW 235 and then outputs the combined signal to the RFSW 233.

The separating unit 32 separates the signal received from the BBU 12 via the CPRI 202 into the transmission signal for each of the transmission unit 21-1 and 21-2 and the message related to control of the antenna control device 15. Then, the separating unit 32 outputs the message related to the control of the antenna control device 15 to the control unit 31 and outputs the transmission signal to each of the transmission unit 21-1 and 21-2.

Furthermore, when the separating unit 32 receives an instruction, from the control unit 31, to stop the transmission by using the transmission unit 21-2, the separating unit 32 stops the output of the transmission signal to the transmission unit 21-2 and outputs the transmission signal to only the transmission unit 21-1. Consequently, the RRH 20 temporarily stops the function of transmitter diversity or MIMO.

When the control unit 31 receives the message indicating the control instruction from the separating unit 32, the control unit 31 instructs the power supply device 200 to generate the power source with the second voltage. Then, the control unit 31 instructs the separating unit 32 to stop transmission by using the transmission unit 21-2. Then, the control unit 31 instructs the RFSW 230 to switch the output destination of the transmission signal processed by the transmission circuit 204-1 from the RFSW 231 to the distribution unit 236. Furthermore, the control unit 31 instructs the RFSW 231 to output the output from the distribution unit 236 to the PA 205-1. Furthermore, the control unit 31 instructs the RFSW 232 to switch the output destination of the signal amplified by the PA 205-1 from the RFSW 233 to the combining unit 237. Furthermore, the control unit 31 instructs the RFSW 233 to output the output of the combining unit 237 to the DUP 206-1.

Furthermore, the control unit 31 instructs the RFSW 234 to output the output of the distribution unit 236 to the PA 205-2. Furthermore, the control unit 31 instructs the RFSW 235 to switch the output destination of the signal amplified by the PA 205-2 from the DUP 206-2 to the combining unit 237. Furthermore, the control unit 31 instructs the distribution unit 236 to distribute the transmission signal output from the RFSW 230 to the RFSW 231 and the RFSW 234. Furthermore, the control unit 31 instructs the combining unit 237 to combine the transmission signal that is output from the RFSW 232 and the transmission signal that is output from the RFSW 235 and then outputs the combined signal to the RFSW 233.

Consequently, the transmission signal that is output from the separating unit 32 to the transmission unit 21-1 is transmitted to, as illustrated by the broken line in FIG. 15, the distribution unit 236 via the transmission circuit 204-1 in the transmission unit 21-1 and is transmitted to the PA 205-1 and the PA 205-2 by the distribution unit 236. Then, the signals amplified by the PA 205-1 and the PA 205-2 are combined by the combining unit 237 and sent from the antenna 16-1 via the DUP 206-1. In this way, a single transmission signal is amplified by a plurality of the PAs 205-1 and 205-2 and combined, whereby it is possible to increase the power of the transmission signal compared with the case in which the signal is amplified by the single PA 205.

In the RRH 20 exemplified in FIG. 15, because the two PAs 205 are used, the power of the transmission signal can be increased by 3 dB compared with a case in which the single PA 205 is used. Furthermore, when the four PAs 205 are used, the power of the transmission signal can be increased by 6 dB compared with a case in which the single PA 205 is used and, when the eight PAs 205 are used, the power of the transmission signal can be increased by 9 dB compared with a case in which the single PA 205 is used.

Furthermore, the RRH 20 according to the seventh embodiment is operated in the same manner as the RRH 20 illustrated in the sequence diagram in FIG. 3. Furthermore, the RRH 20 according to the seventh embodiment decreases, at Step S103 illustrated in FIG. 3, the voltage of power source of the PA 205 and combines the transmission signals amplified by the PAs 205 included in each of the transmission units 21, thereby increasing the power of the transmission signal.

Advantage of the Seventh Embodiment

The RRH 20 according to the seventh embodiment can suppress a decrease in the power of the transmission signal that is output from the PA 205 when the voltage of power source generated by the power supply device 200 is decreased from the first voltage to the second voltage. Consequently, it is possible to keep the effect on communication low, which the effect is caused by a decrease in the voltage of the power source supplied to the PA 205.

Others

In the third embodiment described above, when the RRH 20 decreases the voltage of power source of the PA 205 from the first voltage to the second voltage, the RRH 20 may also further increase the power of the transmission signal by using the same method as that described in the second embodiment, the sixth embodiment, or the seventh embodiment. Furthermore, in the third embodiment described above, when the RRH 20 decreases the voltage of power source of the PA 205 from the first voltage to the second voltage, the RRH 20 may also further increase the power of the transmission signal by using the same method as that described in the fifth embodiment.

Furthermore, in the fourth embodiment described above, after the RRH 20 gradually decreases the voltage of power source of the PA 205 from the first voltage to the second voltage, the RRH 20 may also further increase the power of the transmission signal by using the same method as that described in the second embodiment, the sixth embodiment, or the seventh embodiment. Furthermore, in the fourth embodiment described above, when the RRH 20 gradually decreases the voltage of power source of the PA 205 from the first voltage to the second voltage, the RRH 20 may also further increase the power of the transmission signal by using the same method as that described in the fifth embodiment.

Furthermore, depending on the type of the PA 205, there is also the PA 205 having the characteristic that operates, even if the voltage of power source is decreased to the second voltage, the same gain as that in which the power source with the first voltage is supplied. In this way, the control varies depending on the PA 205 from among the control described in the first embodiment to the seventh embodiment. Thus, information in which each control method is associated with the first voltage is stored in the nonvolatile memory in the RRH 20. When the RRH 20 is started up, the control unit 31 may also measure the first voltage supplied to the PA 205 and read the control method that is associated with the measured voltage from the nonvolatile memory. Consequently, the control program mounted on the RRH 20 can be used in a shared manner.

According to an aspect of an embodiment, it is possible to reduce the size and the weight of remote radio equipment.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A remote radio equipment comprising:
   a power amplifier that is operated by a power source with a first voltage or with a second voltage that is lower than the first voltage and that amplifies a transmission signal;
   an apparatus interface that is connected to an external apparatus that is operated by the power source with the second voltage;
   a power supply device that supplies the power source to the power amplifier and that also supplies the power source to the external apparatus via the apparatus interface; and
   a control unit that controls, when the external apparatus is operated, the power supply device to generate, in common, the power source with the second voltage with respect to the power amplifier and the external apparatus, supply the generated power source with the second voltage to the power amplifier and the external apparatus, and increase power of the transmission signal that is output from the power amplifier operated by the power source with the second voltage.

2. The remote radio equipment according to claim 1, wherein, when the external apparatus is operated, the control unit performs at least one of control for a generating unit to amplify the transmission signal and control for the power amplifier to increase gain of the transmission signal, the generating unit generating the transmission signal that is input to the power amplifier.

3. The remote radio equipment according to claim 1, wherein, when the external apparatus is operated and the power of the transmission signal that is output from the power amplifier is equal to or less than predetermined power, the control unit controls the power supply device to generate, in common, the power source with the second voltage with respect to the power amplifier and the external apparatus.

4. The remote radio equipment according to claim 1, wherein, when the external apparatus is operated, the control unit controls the power supply device to generate the power source with the second voltage by gradually decreasing, by a predetermined voltage from the first voltage to the second voltage for each predetermined time, the voltage of the power source that is being supplied to the power amplifier.

5. The remote radio equipment according to claim 1, wherein, at the control of increasing the power of the transmission signal that is output from the power amplifier, the control unit monitors the power of the transmission signal output from the power amplifier and controls the power supply device to increases the power of the transmission signal output from the power amplifier within the range in which, the power of an out-of-band signal included in the transmission signal output from the power amplifier becomes equal to or less than a predetermined threshold.

6. The remote radio equipment according to claim 1, further comprising:

a plurality of transmission units each of which includes the power amplifier and each of which transmit a different transmission signal;
a distribution unit that inputs the transmission signal to each of the transmission units; and
a combining unit that combines the output from each of the transmission units and that transmits the combined transmission signal, wherein
the power supply device supplies the power source that is common to the power amplifier included in each of the transmission units, and
when the external apparatus is operated, the control unit controls the distribution unit to input the transmission signal to each of the transmission units and controls the combining unit to combine the output from each of the transmission units and send the combined transmission signal.

7. The remote radio equipment according to claim 1, wherein
the control unit returns, when the control unit receives a message from a higher-level device that instructs the remote radio equipment to perform a power supply to the external apparatus, a dummy response, the control unit controls, when the control unit receives a message to control the external apparatus from the higher-level device, the power supply device to supply the power source with the second voltage to the power amplifier and the external apparatus in common and, after the external apparatus completes the control associated with the message to control the external apparatus, controls the power supply device to stop the power supply to the external apparatus and supply the power source with the first voltage to the power amplifier.

* * * * *